United States Patent Office 3,684,735
Patented Aug. 15, 1972

3,684,735
CRUDE OIL DEMULSIFIERS
Knut Oppenlaender, 23 Otto-Dill-Strasse, 6700 Ludwigshafen, Germany– Gert Liebold, 6 Gontardstrasse, 6800 Mannheim, Germany; Rudolf Mohr, 11 Hans-Holbein-Strasse, 6840 Lampertheim, Germany; and Egon Buettner, 16 Wolframstrasse, and Karl Matschat, 9 Kranichstrasse, both of 6700 Ludwigshafen, Germany
No Drawing. Filed Mar. 15, 1971, Ser. No. 124,572
Claims priority, application Germany, Mar. 23, 1970, P 20 13 820.9
Int. Cl. B01d 17/04
U.S. Cl. 252—342       5 Claims

ABSTRACT OF THE DISCLOSURE

Demulsifiers based on mixtures of polyoxyalkylated compounds, a process for their manufacture and their use for breaking water-in-oil emulsions at ambient temperatures.

This invention relates to demulsifiers based on polyoxyalkylated compounds and a process for their manufacture. The invention also relates to their use for breaking water-in-oil emulsions at ambient temperatures.

Block copolymers of alkylene oxides have been known for many years. Such products, which are of special interest in the detergents industry, may be used as demulsifiers for oil-in-water emulsions, that is, emulsions containing predominantly water (U.S. Pat. 2,964,478). However, they are not suitable for resolving emulsions of inverse constituent proportions, that is, water-in-oil emulsions.

The resolution of the latter types of emulsion is, however, a particularly important problem in the mineral oil industry. There has been no lack of attempts at solving this problem, but it has not yet been possible to achieve success in all cases.

Non-ionic surface active materials containing hydrophilic end groups based on polyalkylene oxide, such as oxyalkylated alkylphenols, oxyalkylated alkylphenol/formaldehyde resins, aliphatic oxyethylated amines and oxyalkylated mono- and di-carboxylic acids have hitherto been used for this purpose.

When using such products, the tapped water-in-oil emulsions must be heated to temperatures above 40° C. and sometimes to as high as 80° C. depending on their viscosity, in order to achieve the desired low contents of water, salt and in some cases, residual emulsion by a chemical or electrochemical process. As taught by German published application DOS 1,545,250, certain block copolymers of ethylene oxide and propylene oxide are added to the emulsion at temperatures near 80° C. to achieve resolution thereof to a residual water content of 0.1%.

Thus the known demulsifiers only act at elevated temperatures. When used at lower temperatures, they frequently leave unduly large concentrations of residual water, residual emulsion or residual salt.

It is an object of the invention to provide universally applicable demulsifiers for water-in-oil emulsions which do not have the aforementioned drawbacks and may be used at ambient temperatures. The invention also relates to the manufacture and use of the demulsifiers at temperatures at which the crude oil emulsions are usually tapped, that is, at from about 10° to not more than 40° C.

We have now found crude oil demulsifiers for water-in-oil emulsions which are active at temperatures of from about 10° to 40° C. and are based on polyoxyalkylated compounds and whose properties even exceed those required in the petroleum industry. They contain (A) from 25 to 75% by weight (based on the demulsifier) of an oxyethylation and/or oxypropylation product of
  (a) an isoalkylphenol/formaldehyde resin containing from 3 to 30 benzene nuclei each of which carries an oxyalkylate group, which contains from 4 to 50 alkylene oxide units, and an isoalkyl radical of from 8 to 12 carbon atoms attached in the p-position to the oxyalkylate group, or
  (b) a polyfunctional compound selected from the group consisting of aliphatic polyhydroxy compounds of from 2 to 10 carbon atoms, aromatic polyhydroxy compounds of from 6 to 15 carbon atoms, aliphatic or aromatic diisocyanates of from 6 to 20 and 6 to 13 carbon atoms respectively in the hydrocarbon skeleton and aliphatic dicarboxylic acids of from 4 to 20 carbon atoms, each of which carries from 30 to 150 alkylene oxide units per functional group, and
(B) from 75 to 25% by weight (based on the demulsifier) of an esterification product of rosin or a mono-, di- or tri-ester of maleopimaric acid with
  (a) oxyethylation and/or oxypropylation products of polyfunctional compounds selected from the group consisting of aliphatic dicarboxylic acids of from 4 to 20 carbon atoms, aliphatic or aromatic diisocyanates of from 6 to 20 and from 6 to 13 carbon atoms respectively in the hydrocarbon skeleton and aliphatic polyhydroxy compounds of from 2 to 10 carbon atoms, each of which carries from 30 to 150 alkylene oxide units per functional group, or
  (b) an isoalkylphenol/formaldehyde resin containing from 3 to 30 benzene nuclei each of which contains an oxyalkylate group, which has from 4 to 50 alkylene oxide units, and an isoalkyl radical of from 8 to 12 carbon atoms attached in the p-position to the oxyalkylate group.

The demulsifiers are obtained by mixing from 25 to 75% by weight of component A with from 75 to 25% by weight of component B as defined above.

The component A for the demulsifiers of the invention is prepared by the oxyalkylation of alkylphenol/formaldehyde resins or of polyfunctional compounds.

The oxyalkylated alkylphenol/formaldehyde resins have the formula:

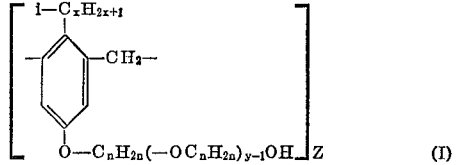

(I)

in which $x$ is one of the integers 8 to 12, $n$ is 2 or 3, $y$ is one of the integers 4 to 50 and $z$ is one of the integers 3 to 30.

Isoalkylphenols which are suitable for condensation with formaldehyde followed by oxyalkylation are those which contain from 8 to 12 carbon atoms in the isoalkyl radical attached in the p-position to the phenolic hydroxyl group. Preferred isoalkylphenols are isooctyl, isononyl and isododecyl phenols. The condensed and oxyalkylated resins contain from 3 to 30 and preferably from 4 to 18 phenol nuclei and contain from 4 to 50 ethylene oxide and/or propylene oxide units per phenol unit. Particularly suitable resins are oxyethylated iso-octylphenol/ formaldehyde resins containing from 20 to 30 ethylene oxide units and from 4 to 15 phenol nuclei.

The preparation of such resins is carried out in the conventional manner by basic catalysis, condensation products of the resol type being formed.

The equally possible condensation in the presence of acid catalysts such as hydrochloric, sulfuric, phosphoric, p-toluene sulfonic and boric acids leads to the formation of novolaks. The condensates obtained by either method are equally suitable for use as starting products for the preparation of the component A.

Both types of condensation are carried out in inert media at from 120° to 150° C. Suitable reaction media are organic solvents which are chemically inactive under the conditions of the reaction and which have boiling points near 150° C. They include substances such as xylene, kerosine or tetrahydronaphthalene.

Solvents which donate no protons under the conditions of the reaction remain in the products after the condensation reaction.

These products are then reacted with ethylene oxide and/or propylene oxide in known manner, for example in a stirred autoclave using basic catalysts and temperatures of from 120° to 135° C. and preferably from 125° to 130° C. and pressures of from 2 to 12 and preferably from 3 to 8 atmospheres gage.

The oxyalkylated isoalkylphenol/formaldehyde resins may be replaced, in component A, by polyoxyalkylated polyfunctional compounds of Formula II:

$$X—(A_l—B_m—A_n)_y \qquad (II)$$

in which A is the radical $—(O—CH_2—CH_2)$, B is the radical $—(O—CH_2—CH(CH_3))—$, X is the y-valent residue of a compound having a number of the same functional groups, $l$ and $n$ are each one of the integers 5 to 90, $m$ is one of the integers 0 to 60 and two of the indices $l$, $m$ and $n$ may be equal to zero, $l$ and $n$ being the same or different, and $y$ is one of the integers 2 to 10.

Preferably, $l$ and $n$ are the same and stand for one of the integers 10 to 50 and $m$ is preferably one of the integers 15 to 50.

From 30 to 150 and preferably from 35 to 100 alkylene oxide units are attached per functional group.

X stands for residues of polyfunctional compounds, examples of which are aliphatic polyhydroxy compounds of from 2 to 10 and preferably from 2 to 6 carbon atoms, such as ethylene glycol, propylene glycol, neopentyl glycol, butanetriol, trimethylolpropane, glycerol, pentaerythritol, tetramethylolcyclohexanol and sorbitol, or aromatic or araliphatic polyhydroxy compounds of from 6 to 15 and preferably from 6 to 10 carbon atoms, examples of which are resorcinol, pyrogallol and bis-p-hydroxyphenolpropane. Other examples are dicarboxylic acids of from 4 to 20 and preferably from 6 to 20 carbon atoms, such as adipic acid or heptadecane dioic acid, by which we mean both 1,8- and 1,9-heptadecane dioic acids or mixtures thereof, and residues having from 6 to 20 and preferably from 6 to 13 carbon atoms and derived from aliphatic or aromatic diisocyanates, for example from hexamethylene diisocyanate, o- or p-toluylene diisocyanate, nonadecyl diisocyanate and diphenylmethane diisocyanate.

Particularly suitable residues X are derived from bifunctional compounds, of which the residues of dicarboxylic acids such as adipic acid and heptadecane dioic acid are preferred.

The oxyalkylated polyfunctional compounds are prepared either by the direct reaction of the corresponding polyethylene and/or polypropylene glycol with the polyfunctional compound or by allowing ethylene oxide and/or propylene oxide to act on the polyfunctional compound, if desired alternately in a number of steps, at a pressure of from 2 to 12 and preferably from 3 to 8 atmospheres gage and a temperature of from 120° to 150° C. and preferably from 120° to 135° C. For example, esterified adipic acid is obtained by esterification with a block copolymer of ethylene oxide and propylene oxide.

The second component (B) of the mixture constitutes an esterification product of rosin or the abietic acid, a triterpene, contained therein in a concentration of about 96%, or of maleopimaric acid formed therefrom by Diels-Alder addition with maleic anhydride. Derivatives of maleopimaric acid are particularly advantageous because this acid is trifunctional, that is, it can be esterified on three carboxyl groups.

Suitable alcoholic esterification components are the oxyalkylated compounds of Formula II, which according to the above definition are oxyalkylated polyfunctional compounds. Other suitable esterification components are oxyalkylated polyalkylene glycols of Formula III:

$$HO—A_l—B_m—A_n—OH \qquad (III)$$

in which A, B, $l$, $m$ and $n$ have the meanings given above for Formula II. Oxyalkylated alkylphenol/formaldehyde resins as characterized by the Formula I given above are also suitable as alcoholic esterification components.

In addition to the oxyalkylated polyfunctional compounds of Formula II, such as adipic acid and heptadecane dioic acid polyalkylene glycol esters, polyalkylene glycols of Formula III alone are suitable, examples being polyoxyalkylated polypropylene glycols, in the formula of which $l$ and $n$ are the same and preferably stand for one of the integers 10 to 50 and $m$ stands for one of the integers 15 to 50.

All of the representatives of the oxyalkylated isoalkylphenol/formaldehyde resins, as defined by Formula I above, are suitable as esterification components.

The absolute number of polyalkylene oxide units contained in the esterification products is restricted. Where polyfunctional compounds of Formula II and III are the basis of the esterification components, this number is from 30 to 150 and preferably from 35 to 100 per functional group. In the case of isoalkylphenol/formaldehyde resins from 4 to 50 alkylene oxide units are attached per phenol nucleus. Thus the maximum number of alkylene oxide units is governed by the number of phenol nuclei.

The ingredient B may be prepared in a number of ways, as shown by the following examples:

(1) Rosin or maleopimaric acid is directly esterified with any of the oxyalkylation products stated in a ratio of 1:1 or, in the case of maleopimaric acid, of from 1:1 to 1:3, examples of such products being polyoxyethylated polypropylene glycol or polyoxyethylated isononylphenol/ formaldehyde resin, in the presence of an acid such as sulfuric, p-toluene sulfonic or boric acid.

(2) Rosin or abietic acid or maleopimaric acid is held in an alkaline medium sequentially under ethylene oxide pressure and/or propylene oxide pressure, by which means the polyglycol esters are formed.

(3) Rosin or maleopimaric acid is oxyalkylated as described under (2) above and the resulting compound, which could be used as such as the ingredient B, is then reacted with one of the stated polyfunctional compounds, for example with adipic acid under acid conditions or with hexamethylene diisocyanate.

(4) Esterification is carried out as described under (1) above and the resulting product, which carries from 1 to 3 free hydroxyl group, is then again reacted with one of the polyfunctional compounds, such as adipic acid or heptadecane dioic acid.

(5) Rosin, maleic anhydride and ethylene oxide and/ or propylene oxide or one of the oxyalkylated compounds defined above are mixed together in an autoclave, where the batch is reacted.

The esters (B) obtained are mixed with the component A with stirring in a ratio of from 1:3 to 3:1 by weight (i.e. in percentages of from 25 to 75% by weight of A and from 75 to 25% by weight of B), preferably in a ratio of 1:1.

In another modification, mixing may be effected by blending rosin or maleopimaric acid with isoalkylphenol/formaldehyde resin in a ratio of from 3:1 to 1:3 (i.e. in percentages of from 75:25 to 25:75) and the holding the mixture under ethylene oxide pressure and/or propylene oxide pressure such that from 20 to 100 molar equivalents (preferably from 40 to 80 molar equivalents) thereof are absorbed. This is a reversal of the above procedure, mixing being effected before oxyalkylation. There is random distribution of the ethylene oxide and/or propylene oxide over the two components. The oxyalkylated mixture then contains the components A and B in a ratio of from 1:3 to 3:1 by weight depending on the proportions of functional groups or phenol nuclei, so that this procedure likewise produces the mixtures of the invention.

The individual products are characterized by certain values, such as the saponification value, the acid value and the hydroxyl value, etc. The products are brittle substances which are usually light brown to medium brown, though they are sometimes dark brown in color.

The mixtures of the invention are conveniently used in the form of 50% w./w. solutions. Suitable solvents are organic solvents, particularly aromatic hydrocarbons such as xylene and toluene, although mixtures of aromatic compounds with alcohols of from 1 to 4 carbon atoms may also be used. These solutions are characterized by their viscosity. Some of the intermediates, for example the alkylphenol/formaldehyde resin polyoxyalkylates, may also be characterized by their viscosity.

The demulsifiers of the invention are highly suitable for breaking, at ambient temperature, water-in-oil emulsions containing from about 1.0 to 90% by weight of water or salt water, i.e. having the composition usually encountered in crude oil production.

The agents of the invention are used as 50% solutions or in a more dilute form (concentration not less than 0.5%) and they are conveniently added at the oil well. The reaction takes place at the temperature of the freshly tapped water-in-oil emulsion at such a rate that the emulsion may break up on its way to the processing plant. Here it is readily separated into crude oil (dry oil) and salt water in an appropriate, unheated separator in which an electric field may be used if necessary. Even in very difficult cases most of the salt water is separated in these separators. Further treatment may then be completed in chemical or electrochemical plant (treaters) at elevated temperatures. In such a case, the advantage of the novel agents is that the major part of the water is removed before the emulsion is processed in the treaters and thus a smaller quantity of water has to be heated up. In view of the high specific heat of water ($C_v = 1$ cal. g.$^{-1}$ °C.$^{-1}$) compared with petroleum ($C_v$ approx. 0.5 cal. g.$^{-1}$ °C.$^{-1}$) this constitutes a very significant saving of energy.

Oils which may be treated with the mixtures of the invention must have a pour point which is at least 10° C. below the tapping temperature. Such oils come from a variety of sources, for example Hankensbüttel, Berkhöpen, Steinbke, Stelle (Lower Saxony), Landau (Upper Rhine Valley), Arlesried (Alpine Foreland), Parentis Mimizan (southwest France), Bahrein (Middle East), Nigeria and Austria.

The following examples relate to the preparation of the demulsifiers, their starting materials and their application. In the examples the parts are by weight unless otherwise stated.

EXAMPLE 1

Preparation of maleopimaric acid 543 parts (1.5 equivalents) of rosin are melted under a nitrogen blanket at 160° C. and dried under reduced pressure (20 mm. of Hg) for 4 hours. 147 parts (1.5 equivalents) of maleic anhydride powder are then added at 180° to 190° C. and the mixture is heated at 200° C. for 5 hours. The yield is 600 parts of maleopimaric acid having an acid value of 280.

EXAMPLE 2

Preparation of a representative of component (A, a), oxyalkylated isoalkylphenol/formaldehyde resin (I) Condensation: 1,030 parts (5 equivalents) of iso-octylphenol are dissolved in 0.7 part by volume of xylene at 40° C., and 500 parts (approx. 5 equivalents) of 30% aqueous formaldehyde solution are then added over 90 minutes. After the addition of 0.04 part by volume (0.4 equivalent) of concentrated hydrochloric acid and 3 parts of a pulverized alkylaryl sulfonate, for example dodecylbenzene sulfonate, the mixture is heated at the boil under reflux for 5 hours and after 7 hours 470 parts of hydrochloric acid-containing water are separated, the temperature being raised to 150° C. The yield is 1,870 parts, the acid value being 53 and the hydroxyl value 302 (180 to 320 depending on the degree of condensation). The viscosity ($\eta$) is 84.5 cp. (measured in 50% solution in xylene with a falling ball viscosimeter by Höppler).

(II) Oxyethylation: 127 parts (75 parts of pure substance) of iso-octylphenol/formaldehyde resin as prepared in Example 2(I) in xylene are placed in a stirred autoclave together with 0.65 part of caustic soda (0.5% by weight based on the resin) and reacted with 70 parts of ethylene oxide fed portionwise over from 3 to 5 hours at a pressure of from 2.5 to 7 atmospheres gage. There are thus obtained 195 parts (theory demands 197 parts) of a medium brown viscous product in the form of a 74% solution in xylene.

Acid value of pure product: 0.
Hydroxyl value of pure product: 120 to 135.
Viscosity ($\eta$): 16.5 cp. (measured in 50% solution in xylene).

EXAMPLE 3

Preparation of a representative of component (A, b), a polyethylene glycol dicarboxylic acid ester 300 parts (0.15 equivalent) of the compound:

$$HO(C_2H_4O)_{14}(C_3H_6O)_{40}(C_2H_4O)_{14}H$$

(hydroxyl value 42.5) are reacted with 11 parts (0.075 equivalent) of adipic acid and 3 parts of p-toluene sulfonic acid with stirring under a blanket of nitrogen over 3 hours at 155° C. The mixture is then stirred for 3 hours at 120° C. and 20 mm. of Hg to remove the water of reaction.

Yield: 310 parts.
Hydroxyl value: 23.
Saponification value: 25.
Acid value: 7.

The following Examples 4 to 20 describe the preparation of component B, the esterification products of rosin or maleopimaric acid.

EXAMPLE 4

151 parts (0.5 equivalent) of rosin, 1.5 parts (1% by weight) of caustic soda in the form of a 50% aqueous solution and 46.4 parts (0.8 equivalent) of propylene oxide are together introduced into a 2 liter stirred autoclave of stainless steel, where the mixture is heated to 135° C. and maintained at this temperature until the pressure is constant. The yield is 197 parts (acid value 1.7, saponification value 21, hydroxyl value 213, CO value 10.0 and HI value 141). 39.5 parts (0.1 equivalent) of the above product in 100 parts of dioxane are then placed, together with 0.38 part (approx. 1% by weight) of sodium methylate, in a 2 liter stirred autoclave of stainless steel. 136.5 parts (3.1 equivalents) of ethylene oxide are then pumped in at 125° C., and 180 parts (3.1 equivalents) of propylene oxide are also pumped in at 135° C.

Yield: 354 parts.
Hydroxyl value: 49.

EXAMPLE 5

180 parts (0.06 equivalent) of the compound:

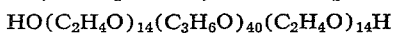
$HO(C_2H_4O)_{14}(C_3H_6O)_{40}(C_2H_4O)_{14}H$ (hydroxyl value 37.4, molecular weight about 3,000), 1.8 parts (1% by weight) of p-toluene sulfonic acid and 18.12 parts (0.06 equivalent) of rosin are mixed together and stirred for 3 hours at 150° C. under a blanket of inert gas at a pressure of 20 mm. of Hg. There is thus obtained a liquid brown-colored product in a yield of 198 parts (equivalent to 99.9% of theory).
Acid value: 15.
Saponification value: 20.
Hydroxyl value: 20.0.
CO value: 12.

EXAMPLE 6

180 parts (0.06 equivalent) of the compound:

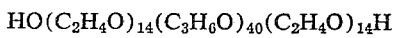
$HO(C_2H_4O)_{14}(C_3H_6O)_{40}(C_2H_4O)_{14}H$ (hydroxyl value 37.4, molecular weight about 3,000), 1.8 parts (1% by weight) of p-toluene sulfonic acid and 36.24 parts (0.12 equivalent) of rosin are mixed together and stirred for 3 hours at 150° C. under a blanket of inert gas at a pressure of 20 mm. of Hg. There is thus obtained a liquid brown-colored product in a yield of 215 parts (equivalent to 99.9% of theory).
Acid value: 27.
Saponification value: 31.
Hydroxyl value: 18.
CO value: 14.0.

EXAMPLE 7

210 parts (0.1 equivalent) of the compound:

$HO(C_2H_4O)_{11}(C_3H_6O)_{26}(C_2H_4O)_{11}H$ (hydroxyl value 55.7, molecular weight 2,100) and 2.1 parts (1% by weight) of p-toluene sulfonic acid and 30.2 parts (0.1 equivalent) of rosin are mixed together and stirred for 3 hours at 150° C. under a blanket of nitrogen at a pressure of 20 mm. Hg.
Acid value: 20.
Saponification value: 23.
Hydroxyl value: 40.
Yield: 240 parts.

EXAMPLE 8

(I) Oxyalkylation: 60.4 parts (0.2 equivalent) of rosin and 0.604 part (1% by weight) of sodium methylate are mixed together and placed in a 2 liter stirred autoclave of stainless steel. There are then fed in, sequentially, under pressure, 80 parts of ethylene oxide (1.8 equivalents) at 125° C., 417 parts (7.2 equivalents) of propylene oxide at 135° C. and, finally, 80 parts (1.8 equivalents) of ethylene oxide at 125° C., each addition being effected portionwise.
Yield: 639 parts.
Acid value: 2.2.
Saponification value: 4.8.
Hydroxyl value: 50.

(II) Esterification: 224 parts (0.07 equivalent) of product (I), 2.2 parts (1% by weight) of p-toluene sulfonic acid and 5.11 parts (0.035 equivalent) of adipic acid are mixed together and then stirred for 3 hours at 150° C. while nitrogen is passed through the mixture, which is finally dried for 3 hours 120° C. at a pressure of 20 mm. of Hg.
Yield: 230.
Acid value: 2.8.
Saponification value: 18.
Hydroxyl value: 64.

EXAMPLE 9

(I) Oxyalkylation: 60.4 parts (0.2 equivalent) of rosin and 1.2 parts (2% by weight) of sodium methylate are together placed in a 2 liter stirred autoclave of stainless steel. There are then fed in, portionwise and under pressure, 230 parts (3.97 equivalents) of propylene oxide at 135° C. followed by 241 parts (5.47 equivalents) of ethylene oxide at 125° C. followed, finally, by 230 parts (3.97 equivalents) of propylene oxide at 135° C.
Yield: 760 parts.
Hydroxyl value: 40.0.

(II) Esterification: 225.5 parts (0.06 equivalent) of product (I), 2.25 parts (1% by weight) of p-toluene sulfonic acid and 9.84 parts (0.03 equivalent) of heptadecane dioic acid are mixed together and then stirred for 3 hours at 150° C. under a blanket of nitrogen and finally dried for 3 hours at 120° C. and a pressure of 20 mm. of Hg.
Yield: 236 parts.
Acid value: 9.0.
Saponification value: 13.
Hydroxyl value: 40.

EXAMPLE 10

1,260 parts (0.5 equivalent) of the compound:

$HO(C_2H_4O)_{14}(C_3H_6O)_{40}(C_2H_4O)_{14}H$ (hydroxyl value 44.3), 12.6 parts (1% by weight) of p-toluene sulfonic acid and 151 parts (0.5 equivalent) of rosin are stirred together for 3.5 hours at 150° C. under a blanket of nitrogen at a pressure of 20 mm. of Hg. The yield is 1,414 parts and the acid value is 10, the saponification value 18.6 and the hydroxyl value 28. 648 parts (0.23 equivalent) of the product thus obtained are then mixed with 3.24 parts (0.5% by weight) of p-toluene sulfonic acid and 75.4 parts (0.23 equivalent) of heptadecane dioic acid, and the mixture is stirred under a blanket of nitrogen for 3.5 hours at 150° C. and a pressure of 20 mm. of Hg.
Yield: 724 parts.
Acid value: 31.5.
Saponification value: 49.5.
Hydroxyl value: 14.5.

The following Examples 11 and 12 describe double esterifications.

EXAMPLE 11

116.6 parts (0.03 equivalent) of the product of bis-p-hydroxyphenylpropane+propylene oxide+ethylene oxide+propylene oxide in equivalent ratios of

1:20.5:28.5:20.5

1.16 parts (1% by weight of p-toluene sulfonic acid and 88 parts (0.03 equivalent) of the ester of the compound of the formula:

$HO(C_2H_4O)_{14}(C_3H_6O)_{40}(C_2H_4O)_{14}H$+rosin+adipic acid in an equivalent ratio of 1:1:1 are mixed together and stirred for 3.5 hours under a blanket of nitrogen at 150° C. and 20 mm. of Hg.
Yield: 203 parts.
Acid value: 9.
Saponification value: 18.
Hydroxyl value: 34.

EXAMPLE 12

74.6 parts (0.02 equivalent) of the product of reacting bis-p-hydroxyphenylpropane with ethylene oxide and then with propylene oxide and again with ethylene oxide in an equivalent ratio of 1:13.65:39.7:13.65, 0.75 part (1% by weight) of p-toluene sulfonic acid and 124.6 parts (0.04 equivalent) of the ester of the compound:

$HO(C_2H_4O)_{14}(C_3H_6O)_{40}(C_2H_4O)_{14}H$+heptadecane dioic acid+rosin in an equivalent ratio of 1:1:1 are stirred together for 3.5 hours under a blanket of nitrogen at 150° C. and a pressure of 20 mm. of Hg.

Yield: 197 parts.
Acid value: 18.5.
Saponification value: 29.
Hydroxyl value: 29.

The following Examples 13 to 15 describe the preparation of esters from rosin/maleic anhydride adducts (maleopimaric acid).

EXAMPLE 13

234 parts (0.1 equivalent) of the compound:

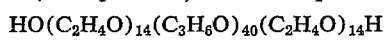

(hydroxyl value 48), 2.34 parts (1% by weight) of p-toluene sulfonic acid and 40 parts (0.1 equivalent) of maleopimaric acid are mixed together and stirred for 3 hours at 150° C. under a blanket or nitrogen. The product is then dried for 3 hours at 120° C. and 20 mm. of Hg under nitrogen.
Yield: 274 parts.
Acid value: 35.
Saponification value: 38.
Hydroxyl value: 17.

EXAMPLE 14

212 parts (0.08 equivalent) of the compound:

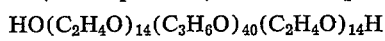

(hydroxyl value 42.3), 2.12 parts (1% by weight) of p-toluene sulfonic acid and 16 parts (0.04 equivalent) of maleopimaric acid are mixed together and stirred for 3 hours at 150° C. under a blanket of nitrogen and then dried at 120° C. and a pressure of 20 mm. of Hg for 3 hours.
Yield: 229 parts.
Acid value: 20.
Saponification value: 3.
Hydroxyl value: 34.5.

EXAMPLE 15

200 parts (0.075 equivalent) of the compound:

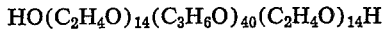

(hydroxyl value 42.3), 2 parts (1% by weight) of p-toluene sulfonic acid and 10 parts (0.025 equivalent) of maleopimaric acid are mixed together and stirred for 3 hours under nitrogen at 150° C. and then dried for 3 hours at 120° C. and a pressure of 20 mm. of Hg.
Yield: 207.5 parts.
Acid value: 18.
Saponification value: 12.
Hydroxyl value: 38.

EXAMPLE 16

30.2 parts (0.01 equivalent) of rosin, 9.8 parts (0.1 equivalent) of maleic anhydride and 270 parts (0.1 equivalent) of the compound:

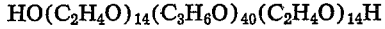

(hydroxyl value 41.5) are melted together and then heated from 90° C. to 290° C. over 9 hours under a blanket of nitrogen.
Acid value: 11.5.
Saponification value: 17.
Hydroxyl value: 16.5.

EXAMPLE 17

260 parts (0.05 equivalent) of the compound obtained in Example 2, 15.1 parts (0.05 equivalent) of rosin and 4.9 parts (0.05 equivalent) of maleic anhydride are melted together and then heated from 90° C. to 290° C. over 9 hours under a blanket of nitrogen.
Acid value: 11.0.
Saponification value: 41.5.
Hydroxyl value: 18.

EXAMPLE 18

260.5 parts (0.1 equivalent) of polyoxyethylated iso-octylphenol/formaldehyde resin, 2.605 parts (1% by weight) of p-toluene sulfonic acid and 40 parts (0.1 equivalent) of maleopimaric acid are mixed together and stirred for 3 hours at 150° C. under a blanket of nitrogen and finally dried for 3 hours at 120° C. and a pressure of 20 mm. of Hg.
Yield: 300 parts.
Acid value: 4.5.
Saponification value: 10.
Hydroxyl value: 124.0.

EXAMPLE 19

260.5 parts (0.1 equivalent) of polyoxyethylated iso-octylphenol/formaldehyde resin, 2.605 parts (1% by weight) of p-toluene sulfonic acid and 20 parts (0.05 equivalent) of maleopimaric acid are mixed together and stirred for 3 hours at 150° C. under a blanket of nitrogen and finally dried for 3 hours at 120° C. and 20 mm. of Hg.
Yield: 280 parts.
Acid value: 2.2.
Saponification value: 6.
Hydroxyl value: 144.0.

EXAMPLE 20

156.5 parts (0.06 equivalent) of polyoxyethylated iso-octylphenol/formaldehyde resin, 1.56 parts (1% by weight) of p-toluene sulfonic acid and 8 parts (0.02 equivalent) of maleopimaric acid are mixed together and stirred for 3 hours under nitrogen at 150° C. and finally dried for 3 hours at 120° C. and 20 mm. of Hg.
Yield: 163 parts.
Acid value: 1.3.
Saponification value: 2.5.

Example 21 illustrates the method of carrying out blending before effecting esterification.

EXAMPLE 21

42.5 parts (0.43 equivalent) of rosin, 42.5 parts of iso-octylphenol/formaldehyde resin and 1.275 parts (1.5% by weight) of sodium hydroxide powder are together placed in a stirred autoclave of stainless steel. There are then fed in, portionwise, under pressure, 62.5 parts (1.4 equivalents) of ethylene oxide at 125° C., 232 parts (4 equivalents) of propylene oxide at 135° C. and, finally, 185 parts (4.2 equivalents) of ethylene oxide at 125° C.
Yield: 562 parts.
Hydroxyl value: 63.

The esterification products obtained in Examples 4 to 20 are now blended with the products obtained in Examples 2 and 3 in a ratio of from 3:1 to 1:3.

The following Examples 22 and 23 describe the use of the mixtures at ambient temperatures.

EXAMPLE 22

100,000 parts of a petroleum emulsion having $p$ parts by volume of water were vigorously stirred, at 20° C., with $q$ parts (not more than 0.01 part) of the products of the invention or, by way of comparison, with conventional demulsifiers based on alkylene oxide, whereupon the mixture was left to stand. The amount of sepaarted water was measured at various intervals. The time $t_1$ was recorded, this indicating the time at which more than 80% of the water had separated, whilst the time $t_2$ indicates the time at which the oil and water had completely separated from each other, apart from the residual water content in the oil. The results of the tests are set out in the following table, which clearly shows the difference between the previous products and those of the present invention. (In the table $p$ and $q$ are given in ml. and mg. respectively.)

TABLE

| No. | Component A | Amount (percent) | Component B | Amount (percent) | Oil source | p(ml.) | q(mg.) | t₁(min.) | t₂(min.) | z (percent) |
|---|---|---|---|---|---|---|---|---|---|---|
| 1 | P | 50 | KV¹ | 50 | Stelle | 32 | 6 | 60 | 180 | 0.6 |
| 2 | P | 50 | K₂V¹ | 50 | do | 32 | 6 | 60 | 180 | 0.6 |
| 3 | P | 75 | KV² | 25 | do | 32 | 6 | 40 | 150 | 0.4 |
| 4 | P | 40 | KV³ | 60 | do | 32 | 6 | 40 | 150 | 0.4 |
| 5 | (ᵃ) | 50 | K | 50 | Hankensbüttel | 40 | 5 | 60 | 150 | 0.2 |
| 6 | P | 50 | K+31A+31B | 50 | do | 40 | 5 | 60 | 150 | 0.5 |
| 7 | P | 50 | M+36B | 50 | do | 40 | 5 | 60 | 150 | 0.2 |
| 8 | P | 50 | M+55B | 50 | do | 40 | 5 | 60 | 150 | 0.2 |
| 9 | P | 50 | M+61B+52A | 50 | do | 40 | 5 | 60 | 150 | 0.2 |
| 10 | V¹₂A | 50 | MV¹ | 50 | do | 40 | 4 | 40 | 90 | 0.2 |
| 11 | V¹₂A | 50 | MV¹₂ | 50 | do | 40 | 4 | 40 | 09 | 0.1 |
| 12 | V¹₂A | 50 | MV¹₃ | 50 | do | 40 | 4 | 60 | 120 | 0.2 |
| 13 | V¹₂A | 50 | MP | 50 | do | 40 | 4 | 40 | 90 | 0.1 |
| 14 | V¹₂A | 50 | MP₂ | 50 | do | 40 | 4 | 40 | 90 | 0.1 |
| 15 | V¹₂A | 50 | MP₃ | 50 | do | 40 | 4 | 40 | 90 | 0.1 |
| 16 | } Comparative example using 100% of V¹ | | | | Stelle | 32 | 6 | ᵇ16 | | 7.5 |
| 17 | | | | | Hankensbüttel | 40 | 5 | ᵇ16 | | 9.5 |
| 18 | | | K₂V¹A | 100 | Stelle | 32 | 5 | ᵇ16 | | 7.5 |
| 19 | | | K₃V¹A | 100 | Hankensbüttel | 40 | 5 | ᵇ16 | | 10.0 |
| 20 | P | 100 | | | Stelle | 32 | 5 | ᵇ10 | | 4.4 |
| 21 | P | 100 | | | Hankensbüttel | 40 | 5 | ᵇ12 | | 6.0 |
| 22 | P | 50 | KV¹ | 50 | Voitsdorf (East Austria) | 40 | 3 | ᵃ120 | 240 | 0.2 |
| 23 | P | 100 | | | do | 40 | 3 | ᵃ10 | | 4.5 |
| 24 | | | | 100 | do | 40 | 3 | ᵃ10 | | 5.5 |
| 25 | P | 50 | KV¹ | 50 | Bahrein (Middle East) | 35 | 2.5 | 30 | 60 | 1.0 |
| 26 | P | 100 | | | do | 35 | 2.5 | 120 | ᵃ10 | 2.0 |
| 27 | | | KV¹ | 100 | do | 35 | 2.5 | 120 | ᵃ10 | 2.5 |
| 28 | V¹₂A | 50 | MV¹ | 50 | Nigeria | 27 | 3.5 | 150 | 300 | 0.0 |
| 29 | V¹₂A | 100 | | | do | 27 | 3.5 | (ᶜ) | | 10.5 |
| 30 | | | MV¹ | 100 | do | 27 | 3.5 | (ᶜ) | | 11.8 |

ᵃ Isoalkylphenol/formaldehyde resin.
ᵇ Hours.
ᶜ No splitting occurred.
Legend:
V = polyoxyethylated polypropyleneglycol ether of Formula III HO—A₁—Bₘ—Aₙ—OH.
A = ethylene oxide radical or ethylene oxide.
B = propylene oxide radical or propylene oxide.
V¹: l = n = 14; m = 40.
V²: l = n = 11; m = 26.
V³: l = n = 30; m = 40.
K = rosin.*

M = maleopimaric acid.*
MV = ester of maleopimaric acid with V.
KV = ester of rosin with V.
MVA = ester of maleopimaric acid with VA.
KVA = ester of rosin with VA.
MP = ester of maleopimaric acid with P.
KP = ester of rosin with P.
P = 1 part by weight of iso-octylphenol/formaldehyde resin oxyethylated with 0.9 part by weight of ethylene oxide (20 to 25 ethylene oxide units).
V¹₂ = adipic acid esterified with V¹ (X—(A₁₄B₄₀A₁₄)).
*The mono-, di- and tri-esters are indicated by subscripts.

EXAMPLE 23

(a) In an oil field in south Germany which taps a crude oil emulsion containing, an average, 28% of water, 15 p.p.m. of a conventional ethylene oxide demulsifier are continuously added to the emulsion at the well. The crude oil emulsion is then heated to 80° C. in a thermal treater forming part of the processing plant. The emulsion is then passed to a settling tank, where the oil and salt water separate until the oil has a residual water content of 0.4%.

(b) When the alkylene oxide metered to the emulsion was replaced by the compound of the invention listed as No. 1 in the above table, separation of the salt water from the oil to a residual water content of 0.3% took place at the temperature of the tapped oil (40° C.) and the temperature at the processing plant (25° C.), that is without heating to 80° C. as before. Thus the thermal treater could be put out of operation. Transportable oil was thus obtained by splitting at ambient temperature.

We claim:

1. Crude oil demulsifiers based on oxyalkylated compounds, containing
   (A) from 25 to 75% by weight (based on the demulsifer of an oxyethylation and/or oxypropylation product of
       (a) an isoalkylphenol/formaldehyde resin containing from 3 to 30 benzene nuclei each of which carries an oxyalkylate group, which contains from 4 to 50 alkylene oxide units, and an isoalkyl radical of from 8 to 12 carbon atoms attached in the p-position to the oxyalkylate group, or
       (b) a polyfunctional compound selected from the group consisting of aliphatic polyhydroxy compounds of from 2 to 10 carbon atoms, aromatic polyhydroxy compounds of from 6 to 15 carbon atoms, aliphatic or aromatic diisocyanates of from 6 to 20 and 6 to 13 carbon atoms respectively in the hydrocarbon skeleton and aliphatic dicarboxylic acids of from 4 to 20 carbon atoms, each of which carries from 30 to 150 alkylene oxide units per functional group, and
   (B) from 75 to 25% by weight (based on the demulsifier) of an esterification product of rosin or a mono-, di- or tri-ester of maleopimaric acid with
       (a) oxyethylation and/or oxypropylation products of polyfunctional compounds selected from the group consisting of aliphatic dicarboxylic acids of from 4 to 20 carbon atoms, aliphatic or aromatic diisocyanates of from 6 to 20 and from 6 to 13 carbon atoms respectively in the hydros carbon skeleton and aliphatic polyhydroxy compounds of from 2 to 10 carbon atoms, each of which carries from 30 to 150 alkylene oxide units per functional group, or
       (b) an isoalkylphenol/formaldehyde resin containing from 4 to 20 benzene nuclei each of which contains an oxyalkylate group, which has from 4 to 50 alkylene oxide units, and an isoalkyl radical of from 8 to 12 carbon atoms attached in the p-position of the oxyalkylate group.

2. Crude oil demulsifiers as claimed in claim 1, in which the component (A) is an oxyalkylation product of an isoalkylphenol/formaldehyde resin having from 4 to 15 phenol nuclei or of a bifunctional compound having from 6 to 20 carbon atoms and the compound (B) is an esterification product with an oxyalkylation product of an aliphatic dicarboxylic acid having from 6 to 20 carbon atoms or of an aliphatic polyhydroxy compound having from 2 to 10 carbon atoms or with an isoalkylphenol/formaldehyde resin having from 5 to 15 phenol nuclei, each of which carries from 20 to 30 ethylene oxide units.

3. A process for the manufacture of crude oil demulsifiers based on oxyalkylated compounds comprising mixing
   (A) from 25 to 75% by weight (based on the total mixture of an oxyethylation or oxypropylation product or a mixture of oxyethylation and oxypropylation products of
       (a) an isoalkylphenol/formaldehyde resin containing from 3 to 30 benzene nuclei each of which carries an oxyalkylate group, which contains from 4 to 50 alkylene oxide units, and an isoalkyl radical of from 8 to 12 carbon atoms attached in the p-position to the oxyalkylate group, or
(b) a polyfunctional compound selected from the group consisting of aliphatic polyhydroxy compounds of from 2 to 10 carbon atoms, aromatic polyhydroxy compounds of from 6 to 15 carbon atoms, aliphatic or aromatic diisocyanates of from 6 to 20 and 6 to 13 carbon atoms respectively in the hydrocarbon skeleton and aliphatic dicarboxylic acids of from 4 to 20 carbon atoms, each of which carries from 30 to 150 alkylene oxide units per functional group, with (B) from 75 to 25% by weight (based on the total mixture) of an esterification product of rosin or a mono-, di- or tri-ester of maleopimaric acid with
(a) oxyethylation and/or oxypropylation products of polyfunctional compounds selected from the group consisting of aliphatic dicarboxylic acids of from 4 to 20 carbon atoms, aliphatic or aromatic diisocyanates of from 6 to 20 and from 6 to 13 carbon atoms respectively in the hydrocarbon skeleton and aliphatic polyhydroxy compounds of from 2 to 10 carbon atoms, each of which carries from 30 to 150 alkylene oxide units per functional group, or
(b) an isoalkylphenol/formaldehyde resin containing from 4 to 20 benzene nuclei each of which contains an oxyalkylate group, which has from 4 to 50 alkylene oxide units, and an isoalkyl radical of from 8 to 12 carbon atoms attached in the p-position to the oxyalkylate group.

4. Modification of the process for the manufacture of crude oil demulsifiers as claimed in claim 3, in which 25 to 75% by weight of abietic acid or maleopimaric acid are mixed with 75 to 25% by weight of alkylphenol/formaldehyde resins, whereupon from 20 to 100 moles of ethylene oxide and/or propylene oxide are introduced under pressure.

5. The use of crude oil demulsifiers containing
(A) from 25 to 75% by weight (based on the demulsifier) of an oxyethylation and/or oxypropylation product of
(a) an isoalkylphenol/formaldehyde resin containing from 3 to 30 benzene nuclei each of which carries an oxyalkylate group, which contains from 4 to 50 alkylene oxide units, and an isoalkyl radical of from 8 to 12 carbon atoms attached in the p-position to the oxyalkylate group, or
(b) a polyfunctional compound selected from the group consisting of aliphatic polyhydroxy compounds of from 2 to 10 carbon atoms, aromatic polyhydroxy compounds of from 6 to 15 carbon atoms, aliphatic or aromatic diisocyanates of from 6 to 20 and 6 to 13 carbon atoms respectively in the hydrocarbon skeleton and aliphatic dicarboxylic acids of from 4 to 20 carbon atoms, each of which carries from 30 to 150 alkylene oxide units per functional group, and (B) from 75 to 25% by weight (based on the demulsifier) of an esterification product of rosin or a mono-, di- or tri-ester of maleopimaric acid with
(a) oxyethylation and/or oxypropylation products of polyfunctional compounds selected from the group consisting of aliphatic dicarboxylic acids of from 4 to 20 carbon atoms, aliphatic or aromatic diisocyanates of from 6 to 20 and from 6 to 13 carbon atoms respectively in the hydrocarbon skeleton and aliphatic polyhydroxy compounds of from 2 to 10 carbon atoms, each of which carries from 30 to 150 alkylene oxide units per functional group, or
(b) an isoalkylphenol/formaldehyde resin containing from 4 to 20 benzene nuclei each of which contains an oxyalkylate group, which has from 4 to 50 alkylene oxide units, and an isoalkyl radical of from 8 to 12 carbon atoms attached in the p-position of the oxyalkylate group, for breaking water-in-oil emulsions at ambient temperatures.

References Cited
UNITED STATES PATENTS

| | | | |
|---|---|---|---|
| 2,454,544 | 11/1948 | Bock | 252—342 |
| 3,042,625 | 7/1962 | Kirkpatrick | 252—342 |
| 3,244,770 | 4/1966 | Kirkpatrick | 252—342 |

JOHN D. WELSH, Primary Examiner

PO-1050
(5/69)

UNITED STATES PATENT OFFICE
CERTIFICATE OF CORRECTION

Patent No. 3,684,735          Dated August 15 1972

Inventor(s) Knut Oppenlaender, Gert Liebold, Rudolf Mohr, et al

It is certified that error appears in the above-identified patent and that said Letters Patent are hereby corrected as shown below:

Cover page, left hand column, line 9, insert -- Badische Anilin-& Soda-Fabrik Aktiengesellschaft, Ludwigshafen (Rhine), Germany --

Signed and sealed this 3rd day of April 1973.

(SEAL)
Attest:

EDWARD M. FLETCHER, JR.
Attesting Officer

ROBERT GOTTSCHALK
Commissioner of Patents